United States Patent
Wicks et al.

(10) Patent No.: US 6,397,084 B1
(45) Date of Patent: *May 28, 2002

(54) WIRELESS TELEPHONE WITH METERED SHUTTLE ON FACE

(75) Inventors: James E. Wicks, San Francisco, CA (US); Yutaka Hasegawa, Edgewater, NJ (US)

(73) Assignees: Sony Corporation, Tokyo (JP); Sony Electronics, Inc., Park Ridge, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/795,125

(22) Filed: Feb. 7, 1997

(51) Int. Cl.[7] .............................. H04B 1/38; H04M 1/00
(52) U.S. Cl. .............. 455/566; 379/433.04; 379/433.06
(58) Field of Search ................................ 455/575, 566, 455/550, 90, 351, 347; 379/433, 434, 428, 433.04, 433.06–433.07; 341/20, 21, 22; 345/145, 157

(56) References Cited

U.S. PATENT DOCUMENTS

| | | | |
|---|---|---|---|
| 3,395,257 A | * 7/1968 | Clark et al. | 379/428 |
| 4,461,033 A | * 7/1984 | Todo | 455/575 |
| 4,513,382 A | * 4/1985 | Faulkner, Jr. | 364/492 |
| D298,035 S | 10/1988 | Watanabe | D14/64 |
| 4,823,397 A | * 4/1989 | Hewitt | 455/90 |
| D319,234 S | 8/1991 | Konno et al. | D14/147 |
| 5,054,051 A | 10/1991 | Hoff | 379/56 |
| D326,451 S | * 5/1992 | Roegner | 379/433 |
| D328,070 S | 7/1992 | Seay | D14/138 |
| D336,472 S | 6/1993 | Lin | D14/138 |
| D337,764 S | 7/1993 | Paton et al. | D14/138 |
| D352,708 S | 11/1994 | Rossi | D14/138 |
| D356,085 S | 3/1995 | Fellinger | D14/148 |
| 5,404,390 A | 4/1995 | Tamura | 379/58 |
| 5,436,954 A | * 7/1995 | Nishiyama et al. | 455/566 |
| D369,796 S | 5/1996 | Grewe | D14/138 |
| 5,627,547 A | * 5/1997 | Ramaswamy et al. | 342/357 |
| 5,633,912 A | * 5/1997 | Tsoi | 455/566 |
| 5,657,370 A | * 8/1997 | Tsugane et al. | 455/575 |
| 5,677,949 A | * 10/1997 | Macor | 379/433 |
| 5,703,571 A | * 12/1997 | Cannon et al. | 455/575 |
| 5,758,295 A | * 5/1998 | Ahlberg et al. | 455/566 |
| 5,761,610 A | * 6/1998 | Sorensen et al. | 455/575 |
| 5,768,362 A | * 6/1998 | Moon | 455/575 |
| 5,841,849 A | * 11/1998 | Macor | 379/428 |
| 5,915,228 A | * 6/1999 | Kunihiro et al. | 455/566 |
| 5,999,827 A | * 12/1999 | Sudo et al. | 455/566 |

FOREIGN PATENT DOCUMENTS

CA        2012199        * 9/1991

* cited by examiner

Primary Examiner—Nguyen T. Vo
(74) Attorney, Agent, or Firm—Ronald Kananen; Rader, Fishman & Grauer, PLLC

(57) ABSTRACT

A wireless telephone unit of the present invention has an improved shuttle for more ergonomically and efficiently entering input to the telephone unit. The shuttle, acting as a rotary encoder, controls the scrolling of material across a display of the wireless telephone unit. The shuttle is located on the face of the wireless telephone unit so as to be operated by the thumb of a user without regard to whether the telephone unit is held in the right or left hand of the user. The shuttle further comprises a detent mechanism such that increments of rotation of the shuttle passed the detent mechanism are perceptible to the user and are correlated to an amount of material scrolled across the display. The shuttle is also displacable along its access of rotation to input parameter information to the wireless telephone unit. The telephone unit's keypad may be hidden in the unit when not in use.

19 Claims, 2 Drawing Sheets

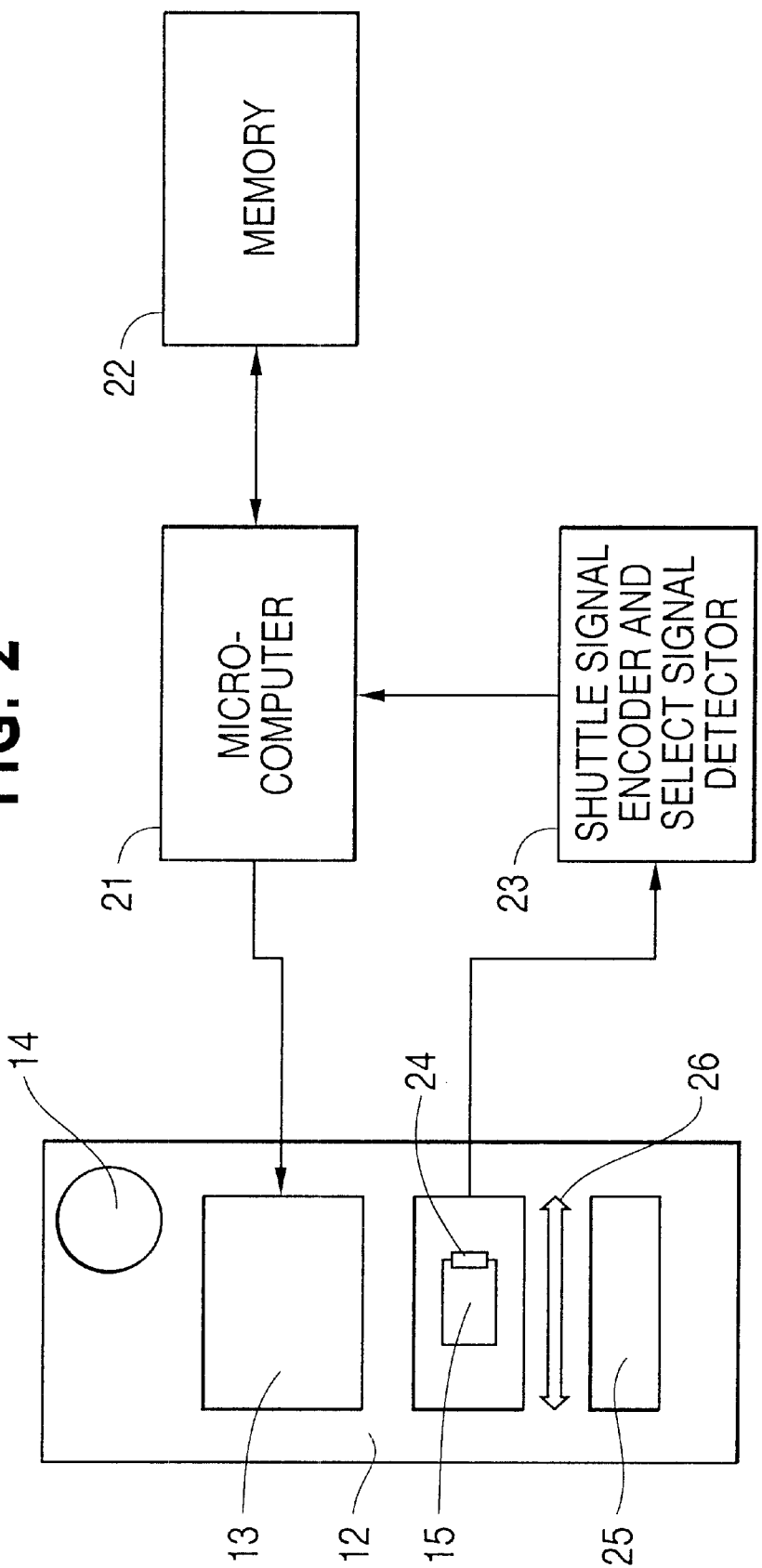

WIRELESS TELEPHONE WITH METERED SHUTTLE ON FACE

FIELD OF THE INVENTION:

The present invention relates generally to the field of wireless telephony. Specifically, the present invention relates to an improved and more ergonomic means for entering input into a wireless telephone unit.

BACKGROUND OF THE INVENTION

Since their introduction, wireless communication systems including pagers, cellular telephones and low-tier radio telephones, have become increasingly popular. Such devices provide an extremely convenient means for communication.

Wireless communication systems, particularly cellular telephones and low-tier radio telephones, are convenient because they allow their users to save time. The user of a wireless telephone unit need not waste time looking for an available telephone in order to place a call. A wireless telephone unit also allows its user to take advantage of time spent traveling. For example, with a wireless telephone, the user can be transacting business or making appointments while driving, riding or walking.

In order to utilize fully these advantages of wireless telephones, it should be convenient for the user to have the wireless telephone unit readily available at all times. In recognition of this fact, modern wireless telephones have become increasingly smaller and lighter to facilitate being carried by the user.

Moreover, a wireless telephone user who is walking or driving, may have only a single hand readily available to operate the wireless telephone unit. This consideration has lead to some attempts to design wireless telephone units that are easily operated with a single hand.

Another important consideration is that traveling users may not have access to a telephone directory or office records when attempting to place a call. This consideration has lead to modern wireless telephones capable of storing important information such as an electronic directory of telephone numbers.

A typical wireless telephone may have a small liquid crystal display capable of displaying up to four lines of characters, for example. Using such a display, the user may scroll through stored data, such as a directory of telephone numbers, and select, for example, a number to be called.

The display may also show a list of functions through which the user can scroll. When a function, such as speaker volume, is selected, the user can then input information or parameters to govern that function.

To allow the user to scroll though information on the display, some modern wireless telephone units provide a shuttle. The shuttle is a dial located on the left side of the wireless telephone unit. The shuttle is freely rotatable about an axis perpendicular to the face, i.e. the display, of the cellular telephone unit, and acts as a rotary encoder.

When the user rotates the shuttle in either direction, the display scrolls through stored information in the corresponding direction. When the appropriate information is displayed, for example, the number the user the wishes to call, means for selecting that information are provided. In the example, the unit then automatically dials the selected number.

However, the shuttle located on the left side of the telephone is ergonomically difficult for a right-handed person to operate, particularly with a single hand. The use of the shuttle is also poorly integrated with the use of other keys on the unit when parameters for governing a function, such as speaker volume, are being input. Moreover, with the freely rotatable shuttle, it is difficult for the user to readily control or determine how much information has been scrolled through by a movement of the shuttle.

Accordingly, there exists a need for a wireless telephone unit which can more ergonomically and efficiently receive scrolling input from the user. There is a further need for a shuttle which allows the user to readily control and determine the amount of information through which the display scrolls in response to the rotation of the shuttle. Also, there is a need for a shuttle which is better integrated into the overall means for controlling the wireless telephone unit.

OBJECTS OF THE INVENTION

Accordingly it is an object of the present invention to meet the above-described needs and others. It is an object of the present invention to provide an improved shuttle means for entering control information to a wireless telephone unit.

More particularly, it is an object of the present invention to provide a shuttle which is ergonomic and easily operated by either a right- or left-handed person.

It is a further object of the present invention to provide a shuttle which allows the user to readily control and determine the amount of information through which a display scrolls in response to the rotation of the shuttle.

It is a further object of the present invention to provide a shuttle which is well integrated into the overall means for controlling the telephone unit so as to facilitate the operation of the wireless telephone unit with a single hand.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve the stated and other objects of the present invention, as embodied and described below, the invention may comprise a wireless telephone unit having: a speaker; a microphone; a display disposed on the face of the unit; a shuttle which is also disposed on the face of the unit such that the shuttle may be operated by a thumb of a user without regard to whether the unit is held in the left or right hand of the user; and means for selecting material displayed on the display. The display is controlled by operation of the shuttle.

The shuttle may rotate about an axis which is perpendicular to a line along which the speaker and the microphone are disposed. The shuttle may further comprise a detent mechanism wherein an increment of rotation of the shuttle is made perceptible to the user by the detent mechanism and that increment of rotation corresponds to a predetermined amount of material to be scrolled across the display in response to the rotation of the shuttle. The predetermined amount of material may be equal to the capacity of the display. The shuttle may also be displacable along an axis about which it rotates, the displacement along the axis being a means of inputting a parameter to the wireless telephone unit.

The wireless telephone unit may also comprise a keypad which slides into and out of the unit. The keypad may be recessed in the unit during those times when the user exclusively calls numbers stored in the unit's memory. The keypad may be pulled out of the unit for use when a number not stored in the unit's memory is to be called.

BRIEF DESCRIPTION OF THE DRAWINGS

The accompanying drawings illustrate the present invention and are a part of the specification. Together will the following description, the drawings demonstrate and explain the principles of the present invention. In the drawings:

FIG. 2 is a block diagram of a wireless telephone unit of the present invention.

DETAILED DESCRIPTION OF THE PREFERRED EMBODIMENT

Figure 1:
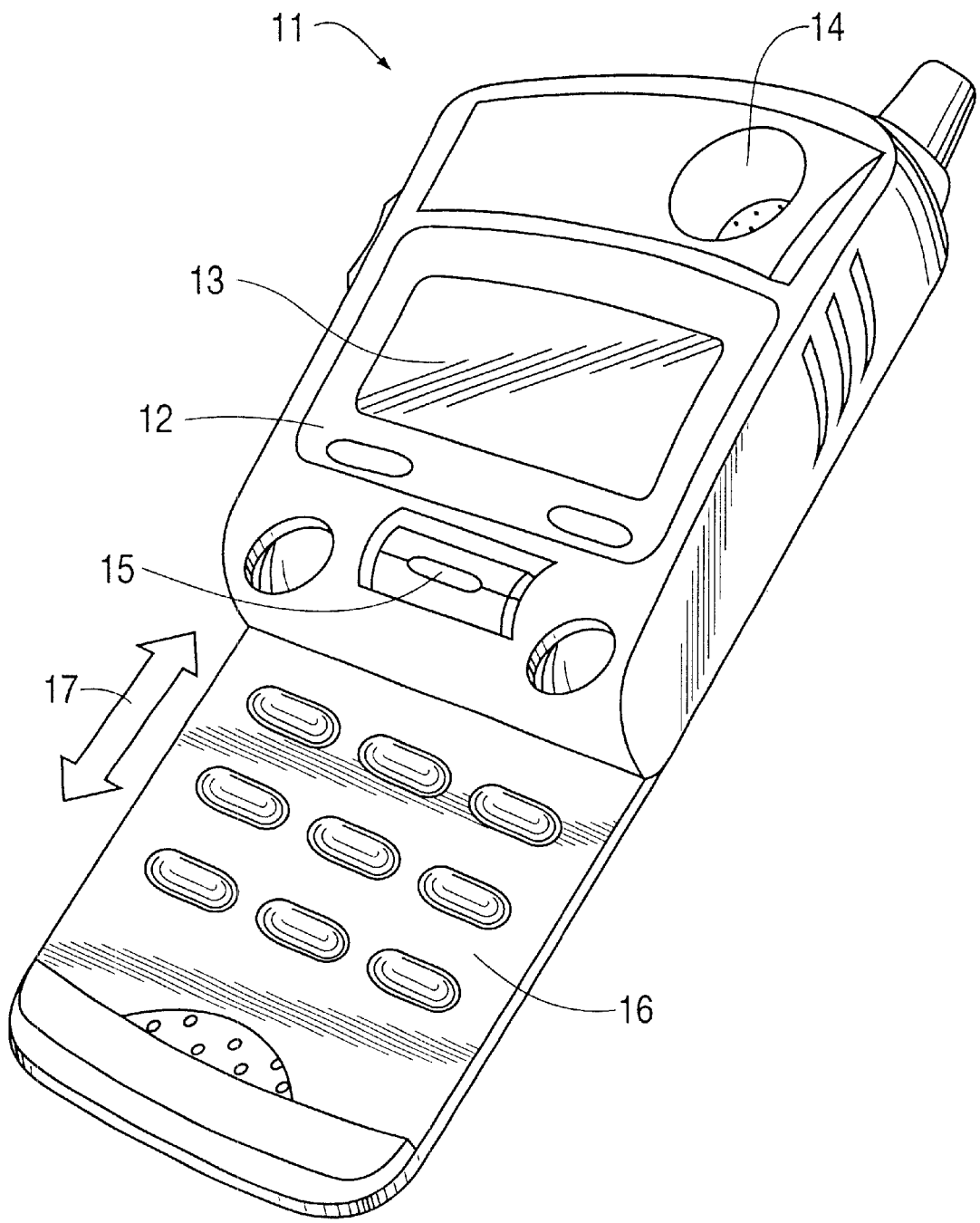
FIG. 1 illustrates a wireless telephone unit of the present invention which incorporates an improved shuttle according to the principles of the present invention.

According to the principles of the present invention, a wireless telephone unit having an improved and more efficient shuttle for accomplishing the above described objects is provided.

As shown in FIG. 1, the wireless telephone unit 11 of the present invention has a face portion 12. The face portion 12 of the wireless telephone unit is that portion which includes the liquid crystal display 13. Typically, the unit's speaker 14 is above the face portion, and the unit's microphone 25 into which the user speaks is located below the face portion. Typically, the face, speaker and microphone are substantially in a common plane. In the alternative, the face portion as defined herein may be on the opposite side of the unit from the speaker and the microphone.

The shuttle 15 of the present invention is located on the face portion 12 of the wireless telephone unit 11, preferably near the center of the face. As seen in FIG. 2, the shuttle 15 rotates about an axis which lies substantially in the plane of the face portion 12 and which is substantially perpendicular to the line along which the speaker 14 and microphone 25 are disposed.

This positioning and orientation of the shuttle 15 allow the user of the wireless telephone unit to hold the unit in either hand and easily and ergonomically operate the shuttle 15 with the thumb of that hand. This allows the wireless telephone unit according to the present invention to be more ergonomically and easily operated with a single hand than was possible with prior art devices.

The operation of the shuttle 15 is further facilitated by providing a shuttle which not only rotates, but which can also be pressed to select the information or function displayed on the display 13. This allows the user to rotate the shuttle 15 to find the desired information or function and then press the shuttle to select that information or function without removing a thumb from the shuttle 15. When the shuttle is pressed the resulting select signal is created by detector 23 and transmitted to microcomputer 21.

According to the principles of the present invention the shuttle 15 is also provided with a means by which the user may perceive and control the amount of rotation of the shuttle. For example, the shuttle 15 of the present invention may be provided with a detent mechanism 24 that governs the rotation of the shuttle 15.

According to the principles of the present invention, the detent mechanism 24 prevents the free rotation of the shuttle 15. Accordingly, the shuttle 15 will rotate passed the detent mechanism 24 only if forced to do so by the user. Preferably, an audible or perceptible click may be perceived by the user for each increment of rotation of the shuttle 15 passed the detent mechanism 24.

As noted, the rotation of the shuttle causes the display 13 of the wireless telephone unit 11 to scroll through data or a menu of available functions. Therefore, according to the principles of the present invention, the increments of rotation of the shuttle 15 passed the detent mechanism 24 are correlated to an amount of data displayed by the display 13. For example, if the display 13 provides four lines of information, each "click" of the shuttle 15 moving passed the detent mechanism 24 will cause the display 13 to scroll through four lines, or one full display screen of text.

Thus, by perceiving the movement of the shuttle 15 against the detent mechanism 24, the user can readily control and perceive how much information has been scrolled on the display 13. This makes it much easier for the user to locate and select the desired information or unit function.

Finally, the shuttle 15 of the present invention may also be displacable to the left or right along its axis of rotation to input parameters to the wireless telephone unit 11. This range of motion is illustrated by arrow 26. For example, if the user is using the shuttle 15 to scroll through a menu of available functions and selects speaker volume, in the prior art for example, the user would then push one of two buttons on the keypad 16 to either increase or decrease the speaker volume.

With a shuttle 15 according to the principles of the present invention, the user would simply scroll through the menu of functions, select speaker volume and then move the shuttle 15 to the right or left to increase or decrease the speaker volume. The motion of the shuttle is registered by the shuttle signal encoder 23 and communicated to microcomputer 21.

The user may thus complete the entire operation with a single hand and without ever taking a thumb off the shuttle 15. Shuttle 15 is thus more fully and smoothly integrated into the overall means for controlling the functions of the wireless telephone unit.

The keypad 16 of the present invention is made to slide 17 in and out of a recess in the body of the wireless telephone unit 11 as shown in FIG. 1. During normal operation, the majority of numbers called by the user of the wireless telephone unit 11 will be numbers which are stored in the memory of the unit and which are accessed using the shuttle 15 to scroll through the list of stored numbers and to selected the number the user wishes to call. Thus, during normal operation, the keypad 16 is superfluous and may be slid into the body of the unit 11. This makes the unit more compact and easier to carry.

When the user needs to place a call to a number which is not stored in the unit's memory or wishes to add a number to the unit's memory, the keypad 16 can be easily pulled out from the recess in the unit body 11. The keypad 16 is then used to enter a new number for dialing or for storage in memory. When the keypad 16 is no longer needed, the user slides the keypad 16 back into the recess in the body of the wireless telephone unit 11.

As shown in FIG. 2, microcomputer 21 controls the basic functions of the unit including driving the display 13. The shuttle 15 disposed on the face 12 of the unit is rotated as described above when the user wishes to scroll through information or available unit functions on the display 13.

The shuttle signal encoder 23 detects the direction and magnitude of the shuttle rotation and provides a signal indicative of the rotation parameters to the microcomputer 21. The microcomputer 21 drives the display in response to the signal from the shuttle signal encoder 23.

The microcomputer 21 is also provided with a memory unit 22. The information, such as a directory of telephone numbers or unit functions, may be stored in the memory unit 22. The microcomputer will then access the information in memory unit 22 as necessary to drive the display in response to the user's rotation of the shuttle 15 and the resulting signal from the shuttle signal encoder 23.

The preceding description has been presented only to illustrate and describe the invention. It is not intended to be exhaustive or to limit the invention to any precise form disclosed. Many modifications and variations are possible in light of the above teaching. The details of a suitable interfaces between side-mounted shuttles, encoded memory and displays are known to the art.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A wireless telephone unit comprising:
    a body, said body having a face portion and a keypad portion;
    a speaker mounted in said face portion;
    a microphone mounted on said body;
    a memory that stores data of a plurality of communicatees;
    a microcomputer that controls a plurality of telephone functions, whereby said microcomputer reads data from the memory in accordance with user instruction;
    a display mounted on said face portion and substantially centered along a body longitudinal axis that displays said data read from the memory;
    a shuttle for selecting a user instruction, said shuttle rotatable about a single axis perpendicular to the longitudinal axis and disposed substantially centered along said longitudinal axis on the face portion and longitudinally below the display such that said shuttle is operated by a user finger with equal ease regardless of whether said unit is held in the left or right hand of said user without the user finger interfering with the user viewing the display;
    a shuttle signal encoder that detects the direction and magnitude of the shuttle rotation and outputs a signal to the microcomputer indicative of the rotation parameters of the shuttle; and
    an input device used in conjunction with said shuttle for selecting material displayed on said display;
    wherein said display is driven by the microcomputer using data read from the memory that was retrieved in response to the user's rotation of the shuttle and the resulting shuttle encoder signal.

2. A wireless telephone unit as claimed in claim 1, wherein said material displayed on said display includes a telephone directory stored by said unit.

3. A wireless telephone unit as claimed in claim 1, wherein said material displayed on said display includes a menu of function of said unit.

4. The wireless telephone unit of claim 1, further comprising:
    a detent mechanism wherein an increment of rotation of said shuttle is made perceptible to said user by said detent mechanism.

5. The wireless telephone unit as claimed in claim 4, wherein said increment of rotation corresponds to a predetermined amount of material to be scrolled across said display in response to the rotation of said shuttle.

6. A wireless telephone unit as claimed in claim 4, wherein said material displayed on said display includes a telephone directory stored by said unit.

7. A wireless telephone unit as claimed in claim 4, wherein said material displayed on said display includes a menu of functions of said unit.

8. A wireless telephone unit as claimed in claim 4, wherein said increment of rotation corresponds to a predetermined amount of material to be scrolled across said display in response to the rotation of said shuttle.

9. A wireless telephone unit as claimed in claim 4, wherein said shuttle may be displaced along said axis, said displacement along said axis being a means of inputting a parameter to said unit.

10. A wireless telephone unit as claimed in claim 4, wherein said input device is activated by pressing said shuttle.

11. A wireless telephone unit as claimed in claim 4, wherein said keypad is movably mounted to slide into a recess in said unit so as to be hidden in said unit when not in use.

12. The wireless telephone unit of claim 1 further comprising:
    a detent mechanism wherein an increment of rotation of said shuttle is made perceptible to said user by said detent mechanism;
    wherein said increment of rotation corresponds to a predetermined amount of material to be scrolled across said display in response to the rotation of said shuttle; and
    wherein said predetermined amount of material is a number of lines of material equal to a maximum number of lines said display can display at one time.

13. A wireless telephone unit as claimed in claim 12, wherein said material displayed on said display includes a telephone directory stored by said unit.

14. A wireless telephone unit as claimed in claim 12, wherein said material displayed on said display includes a menu of functions of said unit.

15. A wireless telephone unit as claimed in claim 12, wherein said shuttle may be displaced along said axis about which said shuttle rotates, said displacement along said axis being a means of inputting a parameter to said unit.

16. A wireless telephone unit as claimed in claim 10, wherein said keypad is movably mounted to slide into a recess in said unit so as to be hidden in said unit when not in use.

17. A wireless telephone unit as claimed in claim 1, wherein when said shuttle is displaced along said axis about which said shuttle rotates, said displacement along said axis being a means of inputting a parameter to said unit.

18. A wireless telephone unit as claimed in claim 1, wherein said input device for selecting is activated by pressing said shuttle into said face.

19. A wireless telephone unit as claimed in claim 1, wherein said keypad is movably mounted to slide into a recess in said unit so as to be hidden in said unit when not in use.

* * * * *